(12) United States Patent
Remington et al.

(10) Patent No.: US 6,227,747 B1
(45) Date of Patent: May 8, 2001

(54) SHAFT RETAINING APPARATUS

(75) Inventors: Philip Michael Remington; Paul Vallis, both of Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/351,234

(22) Filed: Jul. 12, 1999

(51) Int. Cl.[7] .................................................. F16B 7/00
(52) U.S. Cl. ......................... 403/12; 403/154; 15/250.31
(58) Field of Search .................. 403/12, 13, 14, 403/154, 155, 375, 376; 18/250.31, 250.32, 250.34, 250.44, 250.46

(56) References Cited

U.S. PATENT DOCUMENTS

| | | |
|---|---|---|
| 2,712,262 | 7/1955 | Knohl . |
| 2,797,592 | 7/1957 | Marrapese . |
| 2,855,229 | 10/1958 | Winslow . |
| 3,042,953 * | 7/1962 | Batley ............................ 15/250.32 X |
| 3,483,789 | 12/1969 | Wurzel . |
| 4,135,471 | 1/1979 | Wooldridge et al. . |
| 4,732,519 * | 3/1988 | Wagner ............................... 403/14 X |
| 5,507,585 * | 4/1996 | Diederich et al. .................. 403/13 X |
| 5,618,125 * | 4/1997 | McPhee et al. ......................... 403/12 |
| 5,675,862 * | 10/1997 | Reinl .................................. 15/250.31 |
| 5,984,564 * | 11/1999 | Mitterreiter ........................ 403/14 X |
| 6,044,518 * | 4/2000 | Kiso .............................. 15/250.31 X |
| 6,059,294 * | 5/2000 | Gorce ............................ 15/250.34 X |

* cited by examiner

*Primary Examiner*—Harry C. Kim
(74) *Attorney, Agent, or Firm*—Brinks Hofer Gilson & Lione

(57) ABSTRACT

A shaft retaining apparatus has been discovered for retaining a reciprocating shaft within a housing. The shaft retaining apparatus includes a shaft (16) having an outer retainer engaging surface (28) and a shaft housing (18) having a bore for rotatably receiving the shaft and at least one housing protuberance (36) disposed on a shoulder (32) on the housing. A shaft retainer (20) includes a tubular portion (40) and a flange portion (48) disposed at one end of the tubular portion. The flange has at least one retainer protuberance (44) projecting toward the shaft housing. The at least one retainer protuberance has a predetermined height and arcuate length such that it contacts the housing protuberance upon press fitting and disengages thereafter upon rotation of the shaft within the housing, thereby establishing a predetermined clearance between the retainer and the housing.

12 Claims, 2 Drawing Sheets

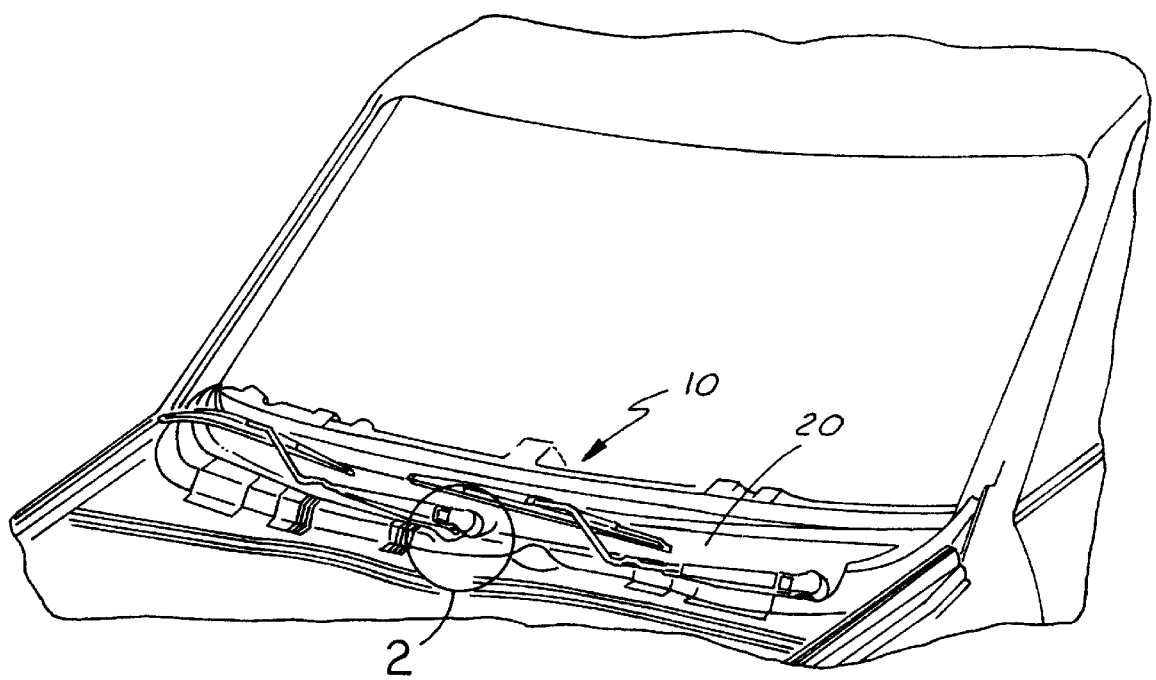
FIG.1
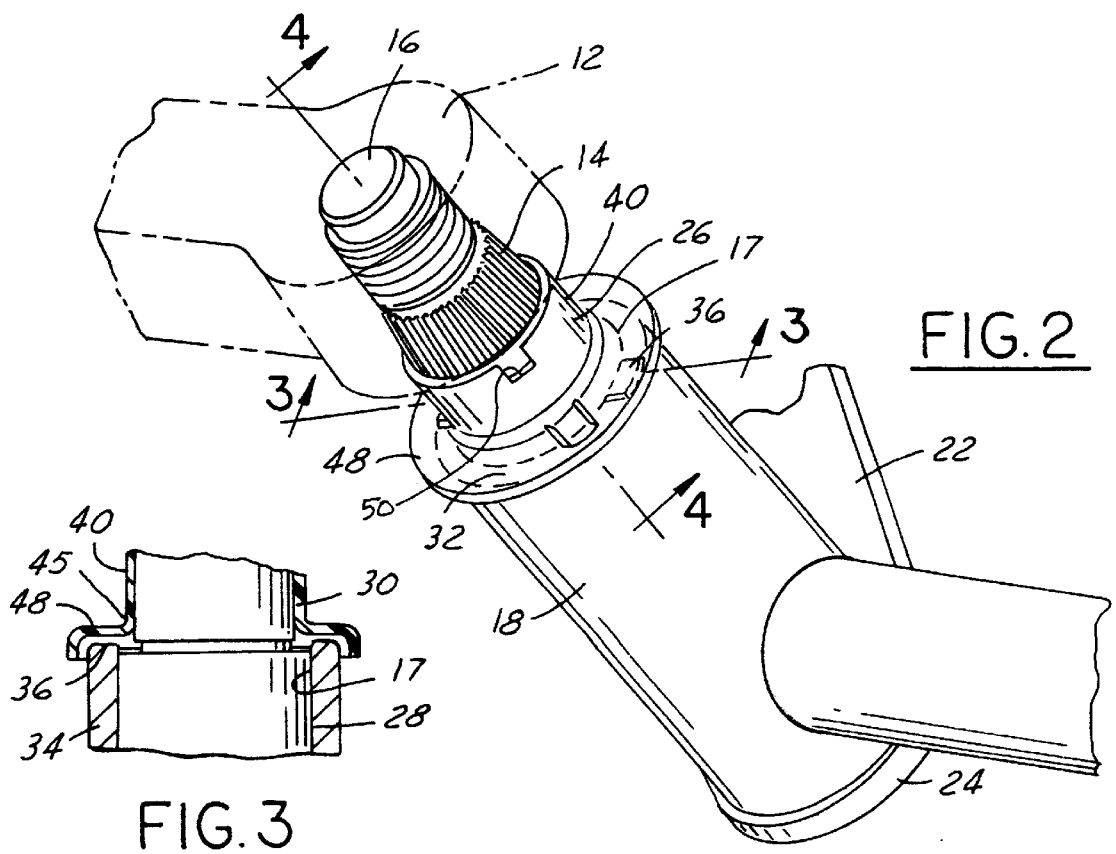
FIG.2
FIG.3

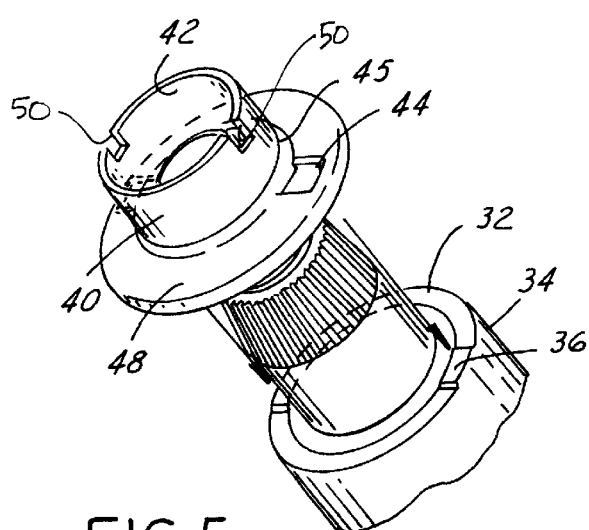
FIG.5
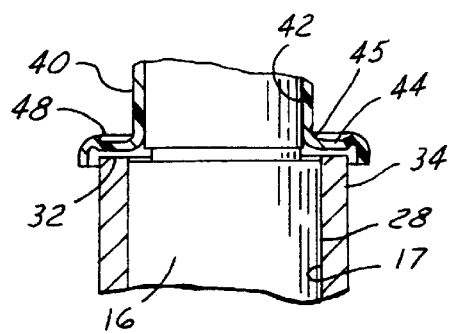
FIG.4
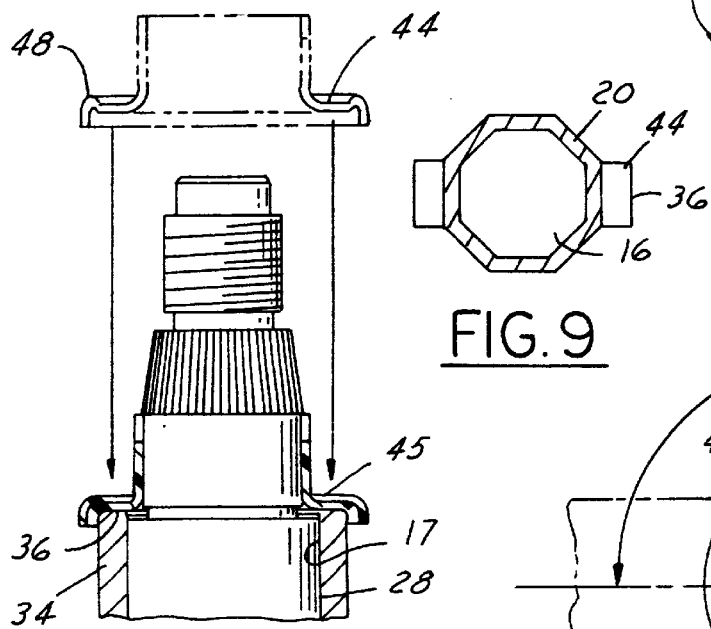
FIG.6
FIG.9
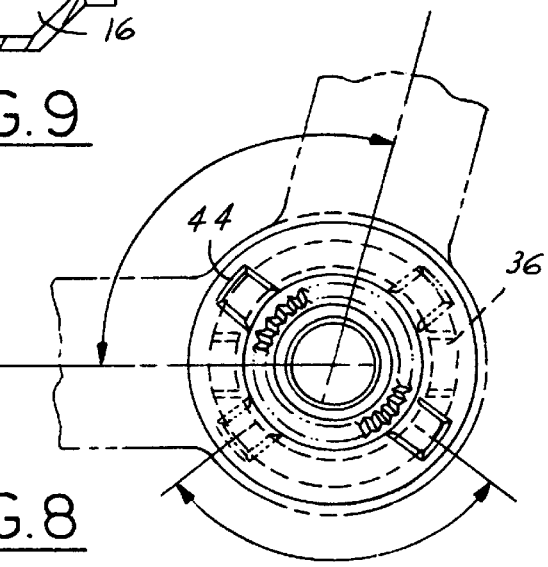
FIG.7
FIG.8

SHAFT RETAINING APPARATUS

BACKGROUND OF THE INVENTION

1. Field of the Invention

This invention relates generally to reciprocating shaft retainers, and more particularly to retainers for maintaining a predetermined clearance between a shaft retainer and a shaft housing, as are found on various switch mechanisms and windshield wiper mechanisms as used on motor vehicles.

2. Disclosure Information

It is well known to use press fit retainers to retain a shaft within a shaft housing. Such retainers can be found on many devices, including rotary dial switches, as found on appliances, such as kitchen stoves, televisions, etc. as well as on heavier mechanical devices such as windshield wipers on motor vehicles. A common problem for such retainers is that they can be installed too far onto the shaft, causing an interference between the retainer and the shaft housing during rotation. This interference is undesirable for many reasons, including noises generated during operation as well as inconsistent efforts, which in turn reflects poorly on craftsmanship and quality.

It would therefore be desirable to provide a shaft retainer apparatus capable of automatically and reliably ensuring a predetermined clearance between the haft housing and the retainer, thereby providing consistent quality and craftsmanship for devices incorporating such design features.

SUMMARY OF THE INVENTION

According to the present invention, a shaft retaining apparatus has been discovered for retaining a reciprocating shaft within a housing. The shaft retaining apparatus includes a shaft having an outer retainer engaging surface and a shaft housing having a bore therethrough for rotatably receiving the shaft and at least one housing protuberance disposed on and projecting away from a shoulder located at a first end of the bore. A shaft retainer includes a tubular portion with an inner surface sized to matingly engage the outer retainer engaging surface of the shaft and a flange portion disposed at one end of the tubular portion. The flange has at least one retainer protuberance formed thereon and projecting toward the shaft housing. The at least one retainer protuberance has a predetermined height and arcuate length such that it contacts the housing protuberance upon press fitting and disengages thereafter upon rotation of the shaft within the housing, thereby establishing a predetermined clearance between the retainer and the housing.

It is an advantage of the present invention to provide reliable clearance between a shaft retainer and a shaft housing for a reciprocating shaft disposed within the shaft housing. The present invention enables high speed, mass production with high confidence of such products incorporating such devices, found in a wide variety of switches and other applications including windshield wiper mechanisms on motor vehicles.

BRIEF DESCRIPTION OF THE DRAWINGS

FIG. 1 is a partial perspective view of a typical windshield wiper system on a motor vehicle including a shaft retaining apparatus in accordance with the present invention.

FIG. 2 is a partial perspective view of a windshield wiper mechanism including a shaft retaining apparatus in accordance with the present invention.

FIG. 3 is a sectional view of a shaft retaining apparatus in accordance with the present invention.

FIG. 4 is sectional view of a shaft retaining apparatus in accordance with the present invention.

FIG. 5 is a partial perspective view of a shaft retaining apparatus in accordance with the present invention.

FIG. 6 is a partial perspective view illustrating assembly of a shaft retaining apparatus in accordance with the present invention.

FIG. 7 is a partial perspective view illustrating initial rotation of a shaft retained by a shaft retaining apparatus in accordance with the present invention.

FIG. 8 is a plan view illustrating a predetermined range of reciprocation a shaft retained by a shaft retaining apparatus in accordance with the present invention.

FIG. 9 is sectional view of an alternative embodiment of a shaft retaining apparatus in accordance with the present invention.

DETAILED DESCRIPTION OF THE PREFERRED EMBODIMENT

Referring now to FIGS. 1–2, a windshield wiper mechanism 10 is shown as commonly found on motor vehicles. A wiper arm 12 is attached by a splined joint 14 to a reciprocating shaft 16 rotatably mounted within a bore 17 of a shaft housing 18. The shaft housing 18 is securely mounted within a cowl 20 of the vehicle. A crank 22 is kinematically connected to a wiper motor at one end (not shown) and connected at its other end 24 to a bottom end (not shown) of the shaft 16. The shaft 16 is inserted through the bore in the shaft housing and retained therein by a shaft retainer 26.

Referring now to FIGS. 2–5, the shaft 16 includes a bearing portion 28 disposed within the bore 17 of the shaft housing. The bearing portion 28 rotates freely relative to the bore 17, aided by permanent lubrication or alternatively a bushing may be inserted between the bore and the shaft. The shaft also includes a cylindrical outer retaining engaging surface 30 having a predetermined diameter to allow for a press fit engagement with the shaft retainer.

The shaft housing includes a shoulder 32 located at a first end 34. The shoulder is preferably machined or otherwise formed perpendicular to a longitudinal axis of the bore 17. At least one housing protuberance 36 is formed on the shoulder 32. The housing protuberance 36 extends away from the shoulder a predetermined height along the longitudinal axis of bore 17, and for a predetermined arcuate distance around the circumference of the shoulder 32. In the presently preferred embodiment, a pair of housing protuberances 36 are disposed with centers substantially 180 degrees apart on the circular shoulder.

The shaft retainer 26 includes a tubular portion 40 with a cylindrical inner surface 42 sized to engage the outer retaining engaging surface 30 in a press fit manner. The shaft retainer 26 also includes at least one retainer protuberance 44 projecting radially outward from an end 45 of the tubular portion adjacent to the housing, as shown in FIG. 9. The retainer protuberance 44 is positioned at a predetermined height relative to the end 45 of the tubular portion and extends a predetermined arcuate distance around the circumference of the tubular a portion 40. In the presently preferred embodiment, an outwardly extending radial flange 48 is formed at the end 45 of the tubular portion 40, with a pair of retainer protuberances 44 formed therein with centers substantially 180 degrees apart on the flange 48. The shaft retainer also includes at least one alignment notch 50 disposed on an end of the tubular portion, preferably, axially aligned with and opposite from the retainer protuberance to assist in automated orientation of the shaft retainer for mechanized assembly.

It should be noted by those skilled in the art that, the cylindrical outer retaining engaging surface 30 and the mating cylindrical inner surface 42 of the shaft retainer do not have to be cylindrical. In fact, in some circumstances, it may be preferred to have non-circular shapes to aid in ensuring proper alignment during assembly of the two components.

Referring now to FIGS. 5–8, installation and operation of the present invention will now be described. With the shaft inserted within the shaft housing, and supported from the crank side, the shaft retainer is aligned so that the retainer protuberances 44 are axially aligned with the housing protuberances 36. Referring to FIG. 6, as the shaft retainer is pressed onto the shaft, the retainer protuberances contact the housing protuberances, halting further sliding of the shaft retainer onto the shaft. At this point, a predetermined clearance is established between the shoulder 32 of the housing and the flange 48 or the end 45 of the shaft retainer. This predetermined clearance is the sum of the height of the housing protuberance and the height of the retainer protuberance. The predetermined clearance is determined as a matter of design choice depending on a variety of operational parameters established during the design and development process.

Referring now to FIG. 7, upon initial rotation of the shaft, which carries the shaft retainer with it, contact between the retainer protuberances and the housing protuberances ceases. At this point, as shown in FIG. 8, the shaft freely reciprocates within a predetermined range of motion without restriction or interference between the shaft housing shoulder and the shaft retainer.

The foregoing description presents two alternative embodiments of the present invention. Details of construction have been shown and described for purposes of illustration rather than limitation. Other modifications and alterations of the invention will no doubt occur to those skilled in the art that will come within the scope and spirit of the following claims.

We claim:

1. A shaft retaining apparatus for securing a reciprocating shaft within a housing, said shaft retaining apparatus comprising:

a shaft having thereon an outer retainer engaging surface;

a shaft housing having a bore therethrough for rotatably receiving said shaft and at least one housing protuberance disposed on and projecting away from a shoulder located on a first end of said bore; and a shaft retainer having a tubular portion having an inner surface sized to matingly engage said outer retainer engaging surface of said shaft and a flange disposed at one end of said tubular portion, said flange having formed thereon at least one retainer protuberance projecting toward said shaft housing, said at least one retainer protuberance having a predetermined height and arcuate length such that said at least one retainer protuberance contacts said at least one housing protuberance upon press fitting and disengages thereafter upon rotation of said shaft within said shaft housing, thereby establishing a predetermined clearance between said shaft retainer and said shaft housing.

2. The shaft retaining apparatus according to claim 1, wherein said outer retainer engaging surface of said shaft and said tubular portion of said shaft retainer are both cylindrical.

3. The shaft retaining apparatus according to claim 1, wherein said outer retainer engaging surface of said shaft and said tubular portion of said shaft retainer are both non-circular so as to aid alignment during assembly.

4. The shaft retaining apparatus according to claim 1, wherein said inner surface of said tubular portion is sized to matingly engage said outer retainer engaging surface in a press fit manner.

5. The shaft retaining apparatus according to claim 1, further comprises a second housing protuberance disposed 180 degrees apart from said at least one housing protuberance and a second retainer protuberance disposed 180 degrees apart from said at least one retainer protuberance.

6. A shaft retaining apparatus for securing a reciprocating shaft within a housing, said shaft retaining apparatus comprising:

a shaft having thereon an outer retainer engaging surface;

a shaft housing having a bore therethrough for rotatably receiving said shaft and a pair of housing protuberances disposed on and projecting away from a shoulder located on a first end of said bore; and a shaft retainer having a tubular portion having an inner surface sized to matingly engage said outer retainer engaging surface of said shaft and a flange disposed at one end of said tubular portion, said flange having formed thereon a pair of retainer protuberances projecting toward said shaft housing, said retainer protuberances having a predetermined height and arcuate length such that said retainer protuberances contact said housing protuberances upon press fitting and disengage thereafter during rotation of said shaft within said shaft housing thereby establishing a predetermined clearance between said shaft retainer and said shaft housing.

7. The shaft retaining apparatus according to claim 6, wherein said outer retainer engaging surface of said shaft and said tubular portion of said shaft retainer are both cylindrical.

8. The shaft retaining apparatus according to claim 6, wherein said outer retainer engaging surface of said shaft and said tubular portion of said shaft retainer are both non-circular so as to aid alignment during assembly.

9. The shaft retaining apparatus according to claim 6, wherein said inner surface of said tubular portion is sized to matingly engage said outer retainer engaging surface in a press fit manner.

10. The shaft retaining apparatus according to claim 6, wherein said pair of housing protuberances are disposed 180 degrees apart and said pair of retainer protuberances are disposed 180 degrees apart.

11. A shaft retaining apparatus for securing a reciprocating shaft within a housing, said shaft retaining apparatus comprising:

a shaft having thereon an outer retainer engaging surface;

a shaft housing having a bore therethrough for rotatably receiving said shaft and at least one housing protuberance disposed on and projecting away from a shoulder located on a first end of said bore; and a shaft retainer having a tubular portion having an inner surface sized to matingly engage said outer retainer engaging surface of said shaft and at least one retainer protuberance disposed at one end of said tubular portion, said at least one retainer protuberance having a predetermined height and arcuate length such that said at least one predetermined retainer protuberance contacts said at least one housing protuberance upon press fitting and disengages thereafter upon rotation of said shaft within said shaft housing, thereby establishing a predetermined clearance between said shaft retainer and said shaft housing.

12. The shaft retaining apparatus according to claim 11, further comprising at least one alignment notch in said tubular portion opposite from and axially aligned with said at least one housing protuberance.

* * * * *